United States Patent [19]
Weil et al.

[11] 3,891,404
[45] June 24, 1975

[54] HEAVY OIL HYDROGASIFICATION PROCESS

[75] Inventors: Sanford A. Weil, Chicago; Paul B. Tarman, Elmhurst; Dharamvir Punwani, Chicago, all of Ill.

[73] Assignee: Institute of Gas Technology, Chicago, Ill.

[22] Filed: Mar. 9, 1973

[21] Appl. No.: 339,545

[52] U.S. Cl.................................. 48/213; 48/211
[51] Int. Cl.............................................. C10g 13/16
[58] Field of Search.......... 48/197, 199 R, 211, 213, 48/210, 201

[56] References Cited
UNITED STATES PATENTS

| | | | |
|---|---|---|---|
| 2,888,395 | 5/1959 | Henny | 208/111 |
| 2,991,164 | 7/1961 | Elliott et al. | 48/197 R |
| 3,421,868 | 1/1969 | Feldman | 48/197 |
| 3,531,267 | 9/1970 | Gould | 48/213 |
| 3,537,977 | 11/1970 | Smith | 208/89 |
| 3,703,052 | 11/1972 | Linden | 48/215 |
| 3,708,269 | 1/1973 | Linden | 48/215 |
| 3,712,800 | 1/1973 | Schutte | 48/197 R |

*Primary Examiner*—S. Leon Bashore
*Assistant Examiner*—Peter F. Kratz
*Attorney, Agent, or Firm*—Molinare, Allegretti, Newitt & Witcoff

[57] ABSTRACT

A process for producing a high methane content, synthetic pipeline gas from heavy fuel oils including crude oil, Bunker "C" residual oil, shale oil, and solubilized coal. The process includes providing a hydrogasification reaction chamber having a hydrogen partial pressure of at least 100 psig and a temperature of 1200°–1500°F. Absorbent inert solids are recirculated from the bottom of the reaction chamber to the top thereof and the heavy fuel oil is introduced into the recirculating solids and both are fed to the top of the reaction chamber. The reaction chamber includes an oil preheat zone having a temperature up to 1000°F., a reaction zone at a temperature of 1200°–1500°F. and a hydrogen preheat zone, also having a temperature of 1200°–1500°F. The solids are moved through the chamber so that the oil is gradually heated to the reaction temperature over a period of at least ten minutes to inhibit the formation of a coke residue. A hydrogen rich gas, containing hydrogen in excess of stoichiometric amounts, is passed upwardly in the reaction chamber and countercurrent to the heavy oil and solids passing downwardly therethrough. A hydrogenation reaction is promoted in the reaction chamber between the oil and hydrogen to produce a mixture which includes volatilized liquids, methane and hydrogen. The mixture is separated into a hydrogasifiable liquid fraction, hydrogen, and the high methane content synthetic pipeline gas. The hydrogen and the hydrogasifiable liquid fraction are circulated back to the reaction chamber, the hydrogen being used as at least a portion of the hydrogen rich gas reacting in the chamber and the hydrogasifiable liquid enters into the hydrogenation reaction.

14 Claims, 3 Drawing Figures

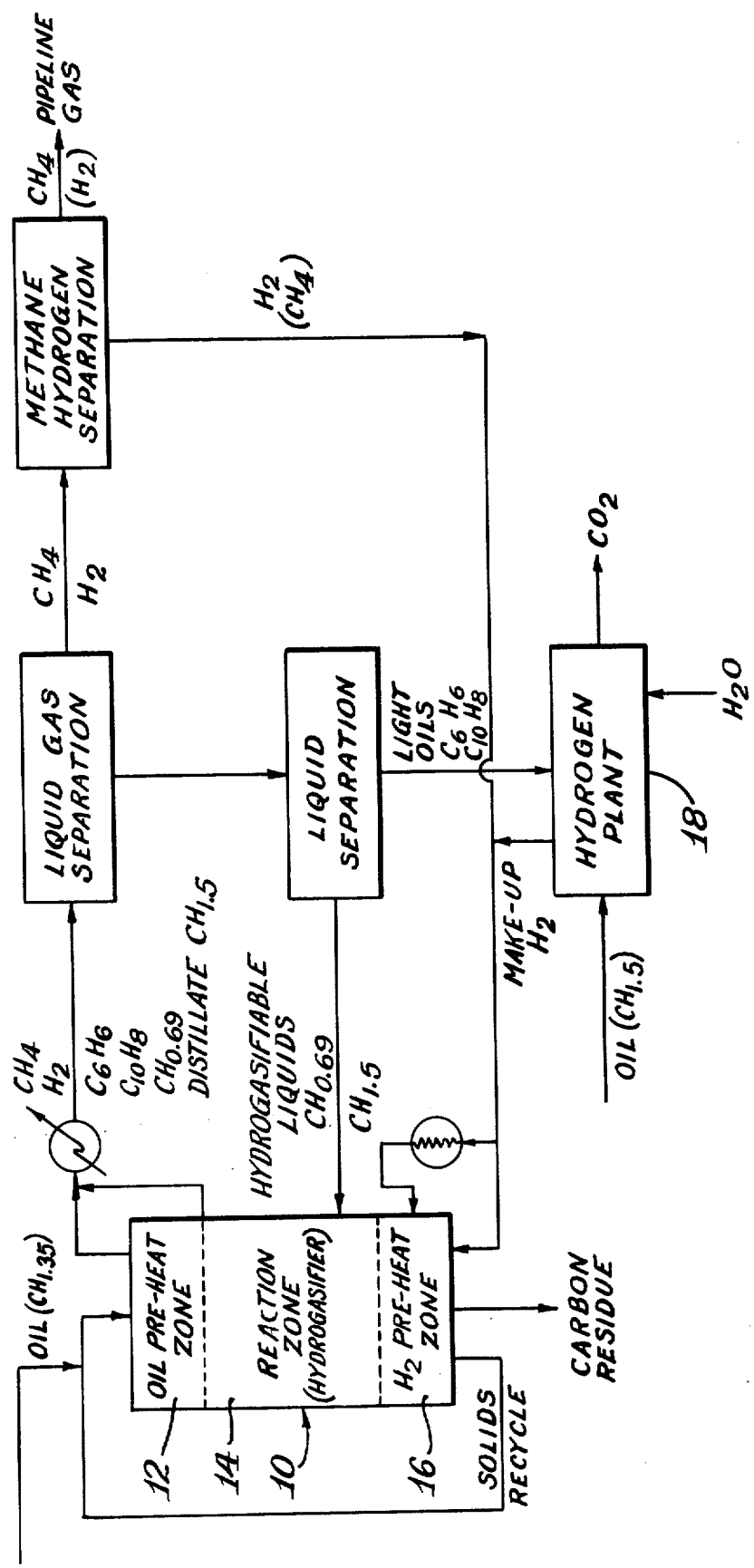

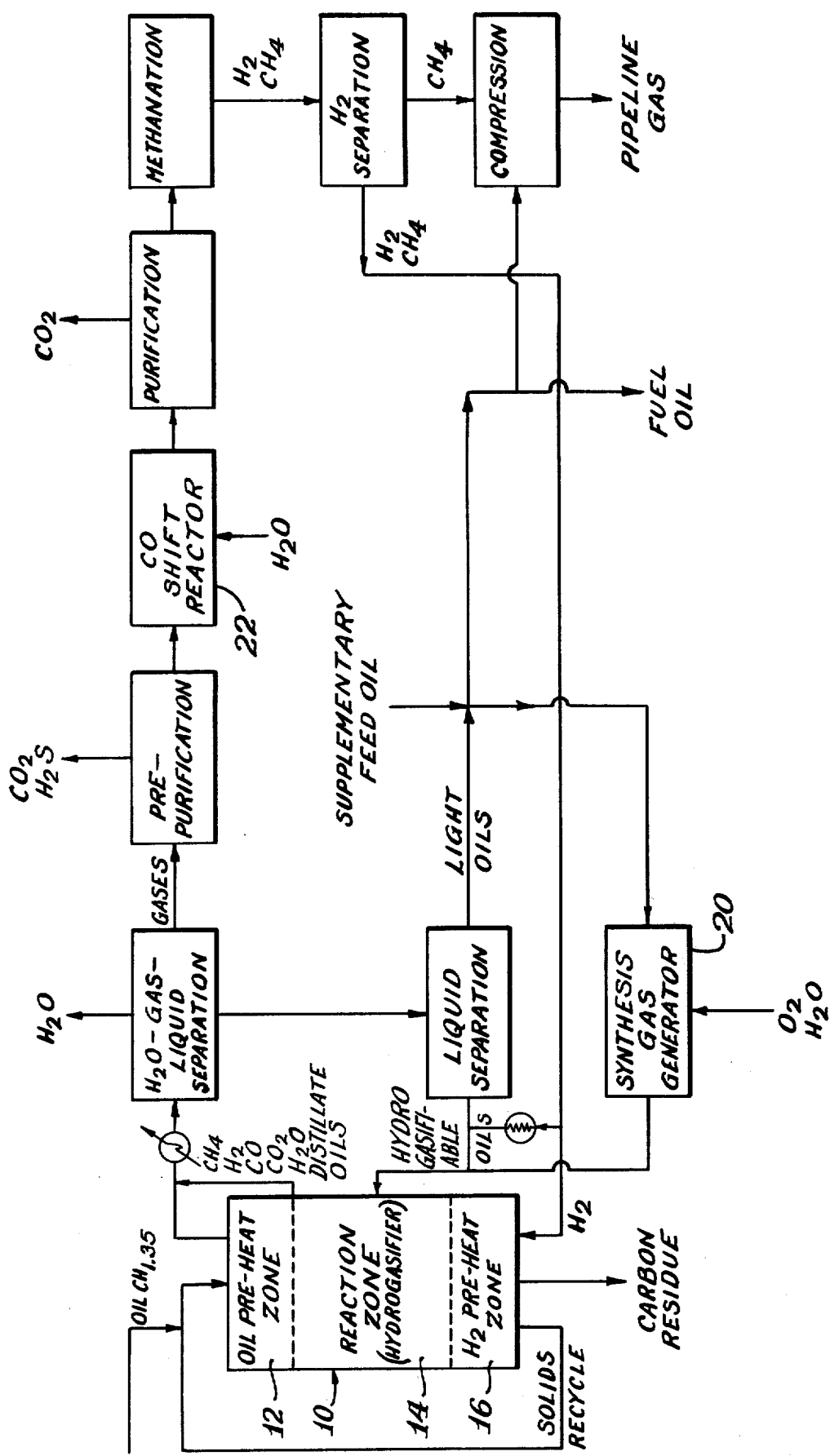

000 3,891,404

HEAVY OIL HYDROGASIFICATION PROCESS

BACKGROUND OF THE INVENTION FIELD OF THE INVENTION and DESCRIPTION OF THE PRIOR ART This invention relates to a process for the manufacture of a high methane content, synthetic pipeline gas suitable for use as a substitute for or as a supplement to natural gas, and the invention particularly relates to a process wherein low cost heavy oils, such as crude oil, residual petroleum oil, shale oil and solubilized coal are used in the production of the synthetic gas.

It is well recognized that there is an increasing shortage of natural gas supplies in the United States, and there is a generally limited supply of natural gas throughout the world, as compared to more abundant reserves of liquid petroleum oils, coal, oil shale, etc. Natural gas suitable for distribution to residential, commercial and industrial consumers is characterized by heating values ranging from about 900 to 1100 BTU/SCF and by a high methane content, normally 80 percent by volume or greater. Such natural gas often includes ethane and sometimes nitrogen. If the nitrogen content is high in natural gas, propane and butane may be added and ethane may be left in the gas to compensate for the diluting effect of the nitrogen. Various sulfur compounds, carbon dioxide, and higher hydrocarbons are normally removed from natural gas before distribution to consumers because they have an undesirable effect on transmission, distribution, and usage of the natural gas. Therefore, in order to provide a suitable substitute or supplement for natural gas, such a substitute or supplement should consist largely of methane, some ethane, but have only a minimum of other constituents.

The elementary composition of suitable gas supplements or substitutes is about 25 percent by weight of hydrogen and 75 percent by weight of carbon. Substantial difficulties are encountered in producing natural gas substitutes or supplements from petroleum oil or heavy oil because these fossil fuels contain carbon and hydrogen in a much higher weight ratio than 3:1. Thus, in order to manufacture a suitable synthetic pipeline gas from a heavy oil, hydrogen must either be added during the manufacturing process or carbon must be removed. Since removal of carbon is generally considered uneconomical, hydrogen is conventionally added. Conventional methods of forming natural gas supplements or substitutes, therefore, involve direct hydrogenation of the heavy oil with an external source of hydrogen. In the case of heavy oils, however, it is necessary to operate at low hydrogen/oil ratios, corresponding to about 50% of the stoichiometric hydrogen necessary for complete conversion to methane. This operation leads to carbon deposition in the hydrogasifier amounting to as much as 30–40% of the carbon in the feed oil. Economical operation of such a process requires that this carbon be used in the process. For example, such unreacted carbon can be used in the production of the hydrogen or synthesis gas used in the hydrogasification step.

Ideal raw materials for producing a suitable synthetic pipeline gas are the low boiling, paraffinic, petroleum fractions, such as LP gas, naptha, natural gasoline, and kerosene, which do not deposit carbon and can be readily hydrogasified. However, such petroleum fractions are not available in the huge amounts necessary for supplementing or replacing the dwindling supplies of natural gas throughout the world, because, particularly in the United States, these are the raw materials used in the manufacture of motor oils and fuels.

Because of the possible future shortage of natural gas, a significant amount of attention has recently been given, particularly in the United States, to the manufacture of synthetic pipeline gas from relatively low cost materials, including heavy oils, such as residual fuel oils and shale oil. Such raw materials are not in demand as motor fuels so that with relatively low processing costs, synthetic pipeline gas, competitive with the cost of natural gas, could be produced from such sources. But the potential energy shortage places emphasis, not only on the cost, but also on the efficiency of energy recovery.

As indicated previously, in the hydrogasification of heavy oils, there is normally an unreacted carbon residue deposit which may amount to as much as 30–40 percent of the feed oil carbon and which may be used in the production of hydrogen or synthesis gas. However, this source of hydrogen is not the most economical. The original oil must be a less expensive source. It is also not the most conservative handling of the thermal energy in the original oil. Coal or other less efficiently hydrogasified oils can be more efficient hydrogen sources. It is therefore clearly highly desirable to provide a hydrogasification process for heavy oils, wherein the coke or unreacted carbon residue is minimized so as to lead to an overall improvement in the economics of the hydrogasification of heavy oils, and in the conservation of energy resources.

SUMMARY OF THE INVENTION

It is therefore an important object of this invention to provide a process for producing a synthetic pipeline quality gas from heavy oils, such as shale oil, residual oil from crude oil, such as Bunker C residual oil, crude oil, solubilized coal, and the like wherein the process is characterized by a greatly reduced amount of unreacted carbon residue or coke formation.

It is a further object of this invention to provide a process for producing synthetic pipeline gas from heavy oils, wherein the economics of the process are significantly better than prior art hydrogasification process because of the greatly reduced amount of carbon residue deposition, which reduces costs involved in the handling of the carbon residue.

It is also an object of this invention to provide a highly economical and thermally efficient process for producing a synthetic pipeline gas from heavy oil wherein the produced gas has heating values as high as natural gas, such as 900–1100 BTU/SCF.

It is yet another object of this invention to provide a process for producing a high methane content, synthetic pipeline gas, from heavy oils wherein a high hydrogen:oil ratio is used in the hydrogasifier whereby the carbon deposition is reduced to an economically negligible amount.

It is still another object of this invention to provide a process for producing a synthetic pipeline quality gas from heavy oils wherein a high hydrogen:oil ratio is used in the hydrogasifier and the resulting high hydrogen concentration in the product gas passing from the hydrogasifier is separated from the methane and is recycled back to the hydrogasifier for reaction, while the methane rich gas is fed directly to the pipeline.

Further purposes and objects of this invention will appear as the specification proceeds.

It is known that high hydrogen/oil ratios, that is, at least above the stoichiometric ratio, are necessary to avoid severe carbon formation at temperatures, as about 1200°-1500°F., necessary for hydrogasification. It is also known that, even at high hydrogen/oil ratios, rapid heat-up of the order of a minute to hydrogasification temperatures can result in severe carbon deposition. Experiments have shown that if the oil is in contact with hydrogen for several minutes at temperature of 800° to 1000°F., significantly less carbon is formed upon subsequent heating to hydrogasification temperatures.

We have now discovered that the foregoing objects are accomplished by providing a unique process for producing a high methane content, synthetic pipeline gas from heavy oils, including shale oil, crude oil, residual oil from crude oil, such as Bunker C residual oil, and solubilized coal wherein the process includes concurrently passing heavy oil and inert solids through a hydrogasification reaction chamber. The solids, which serve primarily as an oil support, move through the chamber with the oil so as to provide at least 10 minutes for heating the oil from 600° to 1000°F. Preferably the heavy oil is heated for a period of 10 - 120 minutes to the hydrogasification temperature. The hydrogen rich gas, corresponding to a high hydrogen: oil ratio, is passed upwardly through the chamber in countercurrent flow to the heavy oil and the solids. In the hydrogasification chamber, which would be at 1200°-1500°F., a hydrogenation reaction is promoted between the oil and the hydrogen rich gas to produce a gaseous mixture, including volatilized liquids, methane and hydrogen. The mixture is thereafter separated into a hydrogasifiable liquid fraction, a poorly or non-hydrogasifiable liquid fraction, if any, a hydrogen fraction, and the high methane content synthetic pipeline gas. The hydrogen and the hydrogasifiable liquids are preferably circulated back to the reaction chamber. The hydrogen is used as at least a portion of the hydrogen rich gas used in the hydrogasification reaction, and the hydrogasifiable liquids also enter the hydrogenation reaction in the reaction chamber. The non-hydrogasifiable liquid fraction or a less reactive fuel or the original fuel is used for the generation of hydrogen or the hydrogen rich gas needed by the process.

BRIEF DESCRIPTION OF THE DRAWINGS

Particular embodiments of the process of the present invention are illustrated in the accompanying drawing wherein:

FIG. 2 is another block diagram illustrating one preferred and efficient form of our inventive process using Bunker C as an example feed oil; and FIG. 3 is a further block diagram illustrating another perferred and thermally efficient embodiment of our invention.

DETAILED DESCRIPTION OF THE PREFERRED EMBODIMENTS

Figure 1:
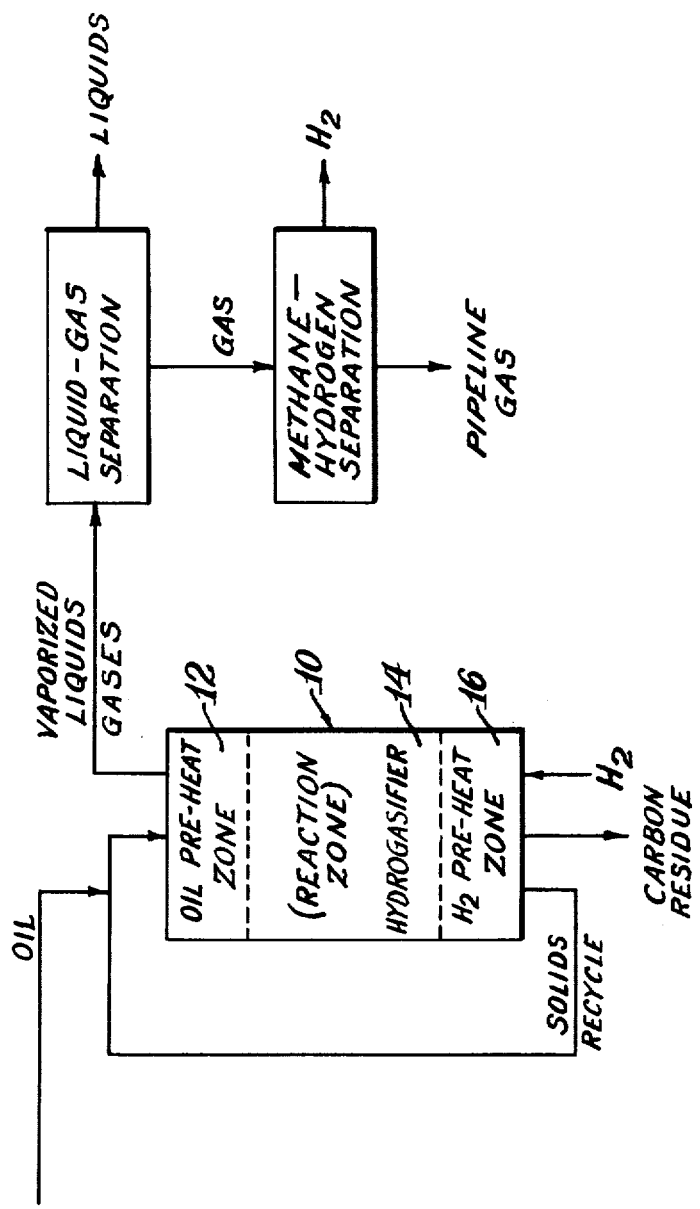
FIG. 1 is a block diagram illustrating a simplified embodiment of our inventive process.

Referring to FIG. 1, our hydrogasification process is illustrated in an extremely simplified diagrammatic form. The hydrogasifier 10 includes three heating zones. The top portion of the hydrogasifier or hydrogasification reaction chamber 10 is an oil preheat zone 12. The central portion of the hydrogasifier reaction chamber 10 is the reaction zone 14 while the bottom portion of the chamber 10 is a hydrogen preheat zone 16.

The heavy oil useful in our process includes heavy liquid hydrocarbons or heavy fuel oils, such as shale oil, residual oil from crude oil, such as Bunker C residual oil, solubilized coal, and crude oil. Typically, the heavy oil is added to cool solids which enter the oil preheat zone 12 and have a velocity range of about 0.2 to 2 feet/min. and preferably a velocity of 1 foot/min. These are recycled from the bottom of the reaction chamber 10 to the top thereof. To avoid excessive solids recirculation, the feed oil should be at least 10 percent and preferably of the order of 50 to 100 percent by weight of the stream of recycling solids. To achieve this, the recycling solids comprise any suitable absorbent inert solids. Examples of suitable materials include charcoal, and various catalyst supports, such as alumina and magnesia. Although the particle size of the recycled solids is not considered critical, except they should not be fluidized by the gas stream, the solids preferably have a size range of about ½ - 1 inch, at their maximum dimension. In the preheat zone 12, the oil and solids are heated from about 800° to about 1000°F. in at least ten minutes. Longer periods, however, are preferred in order to assure lower, if any, carbon deposition.

The flow rate of the solids causes the oil to be preheated to the reaction temperatures gradually over a period of at least 10 minutes. Similar results are obtained if the oil is held at 800°F. for 2 hours at 1000°F for 5 minutes. In the former case, low solids velocities are preferred to avoid recessive reactor lengths.

The oil and inert solids move downward into the reaction zone 14 where the temperature must be between 1200° and 1500°F to achieve hydrogasification conditions. The length of time for which the oil and solids are at these temperatures need not be more than about 10 seconds although longer times, as several minutes, is not detrimental. Consequently, the reaction zone 14 can use a free fall system, or a moving bed system or can be a mixture of the two systems. The residence time of the gas in the reaction zone 14 is the more significant factor as discussed hereinafter. The temperature of the solids leaving the hydrogen preheat zone 16 may be as low as about 300°-700°F.

The pressure in the reaction chamber 10 has a hydrogen partial pressure of at least about 100 psig. Preferably, the partial pressure of the hydrogen in the chamber 10 is about 500 psig. Although the upper limit of the total pressure in the hydrogasifier 10 is not considered critical, a typical practical total upper pressure limit in the reaction chamber is about 1500 psig. The pressure conditions are the same in all three zones of the hydrogasifier.

As indicated in FIG. 1, hydrogen is introduced to the bottom of the chamber and flows countercurrent to the downward flowing bed of oil and inert solids. The flow rate of the hydrogen is such as to provide a 20–50 second residence time in the reaction zone 14. It is considered thermally efficient to preheat the hydrogen to reaction temperatures in the hydrogen preheat zone 16, as indicated previously, prior to introduction of the hydrogen to the reaction zone 14. In such an arrangement, the hydrogen may be introduced to the chamber 10 from a source having a temperature as low as room temperature. Any other source of heat, such as that recovered from the product gases should also be used to preheat the hydrogen. The hydrogen is in an amount that provides a high hydrogen:oil ratio. Preferably, the hydrogen is in excess of the stoichiometric quantities relative to the heavy oil.

Any small amount of carbon residue or unreacted organic carbon is removed from the bottom of the hydrogasification chamber 10. Any of a number of techniques may be used to separate such a carbon residue from the absorbent inert circulating solids when there is an undesirable buildup in the amount of such carbon. One technique is to take a side stream of solids with carbon residue therein from the main stream of recycling solids. Since, in the process of this invention, the gradual heating of the feed oil to reaction temperatures greatly reduces the amount of organic carbon residue, the carbon may be burned off and the inert solids recycled back to the reactor. This scheme results in a highly efficient hydrogasification process with a greatly reduced handling of the high volume of carbon commonly found in prior art processes. For example, it is common to have as much as 30–40 percent carbon residue in other heavy oil hydrogasification processes. In our process, the carbon residue may be negligible relative to the carbon in the original feed oil and normally there will be no more than about 5 percent of unreacted organic carbon remaining from the feed oil.

As seen in the flow diagram of our process in FIG. 1, vaporized liquids and gases are produced in the hydrogasifier 10. The gases generally include methane and hydrogen, while the vaporized liquids are primarily aromatic compounds, including benzene, naphthalene ($C_{10}H_8$), anthracene ($C_{14}H_{10}$), and heavier condensed aromatic structures. If the feed oil contains volatile components, these also will be vaporized.

The first step in our process following the formation of the gaseous mixture is the separation of the mixture into a liquid phase and a gaseous phase. The liquid-gas separation step can be accomplished by any suitable cooling technique, such as a quenching operation by a direct water spray quench or a waste heat recovery system. The quenching or cooling of the mixture coming from the hydrogasifier 10 may reach a rather low temperature, as 100°F., so as to separate the original gaseous mixture into a normal liquid phase and a normal gaseous phase. The separated gaseous phase is then separated into a high methane content, as at least 90 percent by volume, of a pipeline quality gas having a heating value of 900–1100 BTU/SCF, and a hydrogen rich fraction. In the methane-hydrogen separation step, the separation is preferably accomplished by subjecting the gaseous mixture of methane and hydrogen to cryogenic temperatures, at least about −260°F., the approximate boiling point of methane. The methane condenses and the hydrogen fraction remains as a gas.

In the simplified diagrammatic embodiment shown in FIG. 1, there is no indication of further use of the separated hydrogen or separated liquids. In the practical and preferred application of our process, however, the hydrogen and separated liquids are used as integral parts of the process in order to provide a highly thermally efficient process.

FIG. 2 illustrates one preferred embodiment of our invention wherein the hydrogen is separated from the methane and is recycled back to the hydrogasifier 10 and the liquid phase is further separated into a light liquid fraction, consisting primarily of benzene and naphthalene which are difficult to hydrogasify, and a hydrogasifiable liquid fraction, which is introduced to the hydrogasifier 10. As will be shown, this arrangement provides a highly thermally efficient process.

Referring to FIG. 2, the hydrogasifier reactor 10 is constructed in the same way as the reactor 10 of the embodiment of FIG. 1. Again, there is an oil preheat zone 12, a reaction zone 14, and a hydrogen preheat zone 16. The temperature and pressure conditions are also the same as for processes discussed in connection with the simplified process of FIG. 1. Also, the inert absorbent solids are recycled through the hydrogasifier 10 and the flow rate of the solids is such as to provide the desired gradual heating of the feed oil to reaction temperatures, as also discussed in connection with the process of FIG. 1. The carbon residue, a small fraction by weight of the feed oils, is discharged from the bottom of the hydrogasifier 10. In essence, the embodiment of FIG. 2, illustrates a manner of using light liquids in the manufacture of hydrogen, and illustrates the recycling of hydrogasifiable liquids and a hydrogen rich gas stream, separated from the methane rich stream, back to the hydrogasifier 10. Thus, the process embodiment in FIG. 2 is highly thermally efficient process for hydrogasifying heavy oils in the production of a high methane content pipeline quality gas.

In the embodiment of FIG. 2, to balance the heat capacities of various streams in the oil preheat zone 12, some of the hot product gas from zone 14 may by-pass this zone. Instead this gas goes directly to a heat recovery system. Similarly, some of the feed hydrogen instead of entering the hydrogen preheat zone 16 at the bottom, may be heated externally and fed to the preheat zone 16 at an appropriate point, depending upon the preheat temperature. One of the preferred methods of heating this hydrogen may be by the use of the hot gases available for heat recovery.

In the embodiment of FIG. 2, for simplification of discussion, the oil that is fed to the hydrogasifier 10 will be considered as a Bunker C residual oil having an empirical formula of $CH_{1.35}$. Upon hydrogasification of the Bunker C oil, the product gas passing from the top of the hydrogasifier 10 includes methane, hydrogen, benzene, naphthalene, higher aromatics, and Bunker C distillate having an approximate empirical formula of $CH_{1.5}$. As in the embodiment of FIG. 1, this mixture of gases and volatilized liquids is separated into a liquid phase and a gaseous phase by a quenching operation, as described in connection with FIG. 1.

The liquid phase is separated during the liquid-gas separation step consists of the condensed vapors from the product gas and includes both the hydrogasifiable liquid/oils and the non-hydrogasifiable light liquid oils. The hydrogasifiable liquids include the Bunker C distillate, anthracene, and higher aromatics. The light liquids include benzene and naphthalene. Any suitable method may be used for separating the liquid mixture into the heavy and light liquid fractions. A simple distillation step of boiling off the benzene and naphthalene at a temperature of about 200°–400°F. is considered to be quite simple and satisfactory. The heavy or hydrogasifiable liquids are directed into the reaction zone 14 of the reaction chamber 10, as it is not necessary to subject them to the important gradual heat-up that is imparted to the original heavy feed oil added to the hydrogasifier 10. In some cases, where the feed oil has components of extremely low hydrogen to carbon ratios, it will be preferably to separate the hydrogasifiable liquid fraction into a distillate fraction (boiling below 600°F.) and a non-distillable fraction. The former will be fed directly into the reaction zone 14, while the latter is fed into the preheat zone at a temperature of about 600°F. The hydrogasifiable liquids undergo hydrogasification in the reaction zone, in addition to the hydrogasification of the non-volatile components of the feed oil in the reaction zone 14.

As to the light liquids, benzene and naphthalene, these are directed to a hydrogen plant 18 of a commercially available type. These light liquids are used to make hydrogen which is used as a part of the reactant hydrogen in the hydrogasifier 10. The hydrogen plant 18 may be of any suitable commercially available design equipment, such as a hydrogen plant using the well known steam-iron process or a hydrogen plant using the well known partial oxidation method. As indicated in FIG. 2, a raw feed oil of the type which is fed to the hydrogasifier, may, if needed, be added to the hydrogen plant 18 in order to make an adequate amount of hydrogen for use in the hydrogasifier 10. Another cheaper fossil fuel, if available, may also be used for hydrogen generation.

The methane and hydrogen separation step, accomplished by any suitable technique, as cryogenically, results in the hydrogen rich fraction and the high methane content synthetic pipeline gas. Generally, the pipeline quality gas, resulting from the methane-hydrogen separating step, contains at least about 90 percent by volume of methane. Also, at least 80 percent by volume of the hydrogen rich fraction is hydrogen. As shown in the flow diagram of FIG. 2, for the thermally efficient operation of our process, the hydrogen rich fraction resulting from the methane-hydrogen separation step is combined with the make-up hydrogen coming from the hydrogen plant 18 to provide a sufficient amount of hydrogen for use in the reaction zone 14 of the hydrogasifier 10.

Referring to FIG. 3, there is shown another embodiment of our invention also providing a practical thermally efficient system. As in the embodiment of FIGS. 1 and 2, the hydrogasifier 10 of the embodiment of our process shown in FIG. 3, includes the oil preheat zone 12, the reaction zone 14 and the hydrogen preheat zone 16. Substantially the same reaction pressures and zone temperatures are provided in the hydrogasifier 10 as in the process embodiments of FIGS. 1 and 2. Similarly, the same inert absorbent solids which are recycled through the hydrogasifier 10 in the previous embodiments are also used in the process embodiment illustrated in the flow diagram of FIG. 3. The flow rate of the solids passing through the reactor 10 also provide the important gradual heat up of the feed oil to the reaction temperature to thereby inhibit the formation of coke or unreacted organic carbon. As in the embodiment of FIG. 2, the embodiment of our process described in FIG. 3 relates to the use of a Bunker C residual oil as the feed oil that is reacted in the hydrogasifier 10.

The product gas mixture from the hydrogasifier 10 in the embodiment of FIG. 3 is different from the embodiments of FIGS. 1 and 2 primarily because a hot synthesis gas is used instead of hydrogen for hydrogasifying. Because of the inclusion of other gases and steam in the synthesis gas, the product gas mixture from the hydrogasifier of FIG. 3, includes carbon monoxide, carbon dioxide, and steam, in addition to the methane and hydrogen and heavy and light liquids found in the product gas mixture in the hydrogasification reactors of the embodiments of FIGS. 1 and 2. For this reason, the first step following the formation of the product gas in the process of FIG. 3 is the separation of this mixture into three fractions. The first fraction is steam or gaseous water, which may be simply driven off. The second fraction is the gas fraction, and the third fraction is the liquid or oil fraction. The preferred technique for the water-oil-gas separation step is quenching the whole mixture in a quench tower (not shown), for example, which will separate normal gases and normal liquids from each other. The liquids, containing oil and water, are allowed to settle in a settling tank separator (not shown) where water can be removed from the bottom and oils from the upper layers.

As in the embodiment of FIG. 2, the oils resulting from a water-oil separation step are further separated into heavy or gasifiable oils and light liquids or oils. The gasifiable oils or liquids include the Bunker C distillate oil (empirical formula $CH_{1.5}$) and heavy aromatics. The light oils include benzene and naphthalene. The heavy or gasifiable oils are desirably fed directly to the hydrogasification zone 14. The gasifiable oils are preferably intermixed with the synthesis gas, coming from a synthesis gas generator 20. Recycle hydrogen from hydrogen-methane separator is fed to the preheat zone 16.

For the purpose of balancing the heat capacities of various streams as in the embodiment of FIG. 2, the embodiment of the process shown in FIG. 3 may also involve by-passing of the oil preheat zone 12, by some of the hot product gas from the reaction zone 14. This gas may go directly to the heat recovery system. Similar to the process embodiment of FIG. 2, in the embodiment of the process as shown in FIG. 3 also, some of the feed hydrogen may by-pass the preheat zone 16, and may be heated externally. One of the preferred methods of heating this hydrogen stream may be by the use of the hot gases available for the heat recovery.

The embodiment of FIG. 3 is preferably used when it is desirable to add heat to the reactor 10. The synthesis gas generated in the synthesis gas generator may be as high as 2200°F. whereas, in the embodiment of FIGS. 1 and 2, the hydrogen may be at room temperature. The synthesis gas generator 20 uses the well-known partial oxidation process for making synthesis gas, which gas includes hydrogen, carbon monoxide, carbon dioxide, and gaseous water, resulting from the reaction of steam, oxygen and a suitable hydrocarbon, including light oils such as benzene and napthalene resulting from the liquid separation step described above. The hydrogen formed in the synthesis gas generator is considered make-up hydrogen for use in the hydrogasification reactor 10.

In addition to using the light oils or liquids in the synthesis gas generator 20, the light oils may be combined with a supplementary feed oil of any suitable type, such as Bunker C residual oil, before introduction to the synthesis gas generator. An additional or alternate use of the light oils is as a fuel oil as indicated in FIG. 3. The light oils may also be used in the overall process, as, for example, by use as an energy source in the compression of the high methane content pipeline quality gas resulting from our process. Such alternate use of the light oil fraction is illustrated in FIG. 3.

As to the gaseous phase resulting from the water-liquid-gas separation step, the gases are purified to remove carbon dioxide and any hydrogen sulfide. Suitable purification techniques are the well-known hot carbonate and monoethanolamine scrubbing systems. Following the pre-purification step, the gas is passed to a reactor 22 wherein the gases are subjected to the well known carbon monoxide shift reaction. In this reaction, carbon dioxide is formed which is removed by using a technique similar to that used for prepurification. The product gas is then methanated using any conventional methanation technique to result in a gaseous mixture of hydrogen and methane. This gaseous mixture then undergoes the methane-hydrogen separation step such as by use of a cryogenic technique, wherein the methane is condensed, and the hydrogen remains gaseous. The methane or methane rich pipeline quality gases are compressed. The high methane content (at least 90 percent methane) synthetic pipeline quality gas has a heating value of 900–1100 BTU/SCF. The hydrogen fraction, at least 80 percent hydrogen, resulting from the hydrogen-methane separation is used as a principal source of hydrogen in the hydrogasifier 10. Again, as with the process embodiment of FIG. 2, the process embodied by the flow diagram of FIG. 3 provides a highly thermally efficient process for the hydrogasification of heavy oils.

A particular embodiment of our invention is shown by the following example:

EXAMPLE I

Referring to the embodiment of the invention illustrated in FIG. 2, 15,947 mols/hr. of Bunker C residual oils (empirical formula of $CH_{1.35}$) are introduced to recycling porous absorbent inert solids (charcoal) moving at a flow rate of 354 tons/hr. The Bunker C oil and the recycling solids are introduced simultaneously to a relatively cool upper oil preheat zone of a hydrogasification reactor maintained at 1000 psig wherein the oil is heated to 600°F and then heated gradually for at least 10 minutes to bring it up to 1000°F. Further heating brings the oil to the reaction temperature of 1400°F. Hydrogen is passed upwardly through the hydrogasifier in countercurrent flow to the flow of oil and inert solids passing downwardly therein. 36,518 mols/hr. are fed to the reactor, which has dimensions of 10½'I.D. × 120' high. The hydrogen is preheated in the lower zone of the hydrogasifier by the inert solids leaving the hydrogasifier. 797 mols/hr. of organic carbon is deposited on the inert solids passing through the zone 12 and is disposed of by one of many well-known methods. Hydrogasifiable liquids are fed directly to the reaction zone 14 of the hydrogasifier. The hydrogasifiable liquids include 5,581 mols/hr. of the distilled oil (empirical formula $CH_{1.5}$), and 4302 mols/hr. of higher aromatics of average empirical formula $CH_{.69}$.

The product gas comprises 15,149 mols/hr. of methane, 24,191 mols/hr. of hydrogen, 319 mols/hr. of benzene, 271 mols/hr. of higher aromatics 4,302 mols/hr. of $CH_{.69}$, and 5,581 mols/hr. of Bunker C distillate oil. This product gas mixture is then cooled to separate into a gas fraction and a liquid fraction. This cooling is by means of a waste heat recovery device.

The liquid fraction is separated by distillation into light liquids and hydrogasifiable heavy liquids. The light liquids include 319 mols/hr. of benzene and 271 mols/hr. of naphthalene. The light liquids are circulated to a hydrogen plant for the production of make-up hydrogen used in the reactor. Supplementary Bunker C oil is fed to the hydrogen plant in the amount of 5,422 mols/hr. to make enough hydrogen, which comprises 13,395 mols/hr. of hydrogen generated in the hydrogen plant.

The gas passing from the liquid-gas separation is cryogenically separated at a temperature of 31 260°F. to condense the methane. A hydrogen rich fraction and a pipeline quality gas are produced. The hydrogen rich fraction includes 23,123 mols/hr. of hydrogen and 4,624 mols/hr. of methane. This fraction is combined with the make-up hydrogen from the hydrogen plant for use as the hydrogen reactant in the hydrogasifier. The pipeline quality gas formed comprises 10,925 mols/hr. of methane and 1,068 mols/hr. of hydrogen. The product gas has a heating value of 949.5 BTU/SCF.

While in the foregoing, there has been provided a detailed description of particular embodiments of the present invention, it is to be understood that all equivalents obvious to those having skill in the art, are to be included within the scope of the invention as claimed.

What we claim and desire to secure by Letters Patent is:

1. A process for producing a high methane content, synthetic pipeline quality gas from heavy oil, wherein there is a minimal carbon residue formation resulting from the conversion of the heavy oil to the pipeline quality gas which comprises the steps of:

a. continuously flowing absorbent inert solids and the heavy oil through a preheat zone at a flow rate sufficient to provide at least ten minutes to gradually heat the oil from a temperature of 600°F to a temperature of 1000°F.;

b. continuously contacting the heavy oil and solids in the preheat zone during the gradual heating with a countercurrently flowing hydrogen rich gas stream;

c. said hydrogen rich gas stream containing at least stoichiometric amounts of hydrogen to achieve a high hydrogen to oil ratio in the preheat zone;

d. withdrawing preheated inert solids and heavy oil from the preheat zone and passing the preheated solids and heavy oil to a hydrogasification zone;

e. hydrogasifying, in the hydrogasification zone, the preheated heavy oil at a temperature of 1200°–1500°F. in the presence of a countercurrently flowing hydrogen rich gas stream containing at least stoichiometric amounts of hydrogen to achieve a high hydrogen to oil ratio and to produce a gaseous product stream comprising hydrogen, volatized liquid products and gaseous hydrogasification products;

f. maintaining the hydrogen partial pressure in the preheat and hydrogasification zone at a pressure of at least 100 psig.;

g. separating the gaseous product stream produced in the hydrogasification zone to provide a hydrogen rich gas stream, said high methane content synthetic pipeline gas, and a distillate hydrogasifiable liquid fraction and a nondistillate liquid fraction;

h. passing at least a portion of the distillate fraction to the hydrogasification zone;

i. passing at least a portion of the non-distillate fraction to the preheat zone; and j. withdrawing the inert solids from said hydrogasification zone wherein less than 10% of the carbon in the heavy oil feed is deposited as carbon residue on the withdrawn solids.

2. The process of claim 1 wherein said heavy oil is selected from the group consisting of residual oil from crude oil, shale oil, solubilized coal, and crude oil, and said inert solids comprise absorbent inert solids selected from the group consisting of charcoal, alumina, and magnesia.

3. The process of claim 1 wherein said hydrogen partial pressure is about 500 psig in said preheat and hydrogasification zones.

4. The process of claim 1 wherein said heavy oil is heated to the hydrogasification reaction temperature for a period of 10–120 minutes.

5. The process of claim 1 wherein said hydrogen passed to the hydrogasification reaction zone has a residence time in said hydrogasification reaction zone of 20–50 seconds.

6. The process of claim 1 including the step of recycling said inert solids back to said oil preheat zone.

7. The process of claim 1 wherein said gaseous product stream includes light liquids, hydrogasifiable heavy liquids, hydrogen and methane, and wherein said separating step includes first separating said product stream into a gaseous component including methane and hydrogen and a liquid component including said hydrogasifiable liquids and said light liquids, and then separating said gaseous component into said high methane content synthetic pipeline gas and hydrogen.

8. The process of claim 7 including the step of producing make-up hydrogen from said light liquid fraction, and combining said make-up hydrogen with the hydrogen-rich gas used in said hydrogasification reaction.

9. The process of claim 8 wherein a supplemental make up oil is used with said light liquid fraction in producing said make-up hydrogen.

10. The process of claim 1 wherein said gaseous product stream includes steam, carbon monoxide, and carbon dioxide, and said separating step includes separating said mixture into a water fraction, a gaseous fraction, and a liquid fraction.

11. The process of claim 10 wherein said gaseous fraction includes said carbon dioxide, carbon monoxide, hydrogen and methane, and said separating step further includes removing said carbon dioxide, from said gaseous mixture, and thereafter separating said gaseous mixture into said hydrogen fraction and said high methane content synthetic pipeline gas.

12. The process of claim 10 including the step of producing hydrogen rich gas in a synthesis gas generator, said hydrogen rich gas having a temperature of up to 2200°, said synthesis gas also including carbon monoxide, carbon dioxide and steam.

13. The process of claim 1 wherein said hydrogen is passed through said process in stoichiometric amounts.

14. A process as in claim 1 wherein the gaseous product stream from the hydrogasification zone is first passed to said preheat zone as the hydrogen rich gas stream used in step (b) prior to the separation.

* * * * *